Z. T. HARTMAN.
Vegetable-Cutters.

No. 155,797.          Patented Oct. 13, 1874.

UNITED STATES PATENT OFFICE.

ZACHARY T. HARTMAN, OF PHILADELPHIA, PENNSYLVANIA.

IMPROVEMENT IN VEGETABLE-CUTTERS.

Specification forming part of Letters Patent No. 155,797, dated October 13, 1874; application filed March 13, 1874.

*To all whom it may concern:*

Be it known that I, ZACHARY TAYLOR HARTMAN, of Philadelphia, in the county of Philadelphia and State of Pennsylvania, have invented certain new and useful Improvements in Vegetable-Cutters; and I do hereby declare the following to be a full, clear, and exact description of the invention, such as will enable others skilled in the art to which it pertains to make and use it, reference being had to the accompanying drawings, which form part of this specification, in which—

Figure 1:
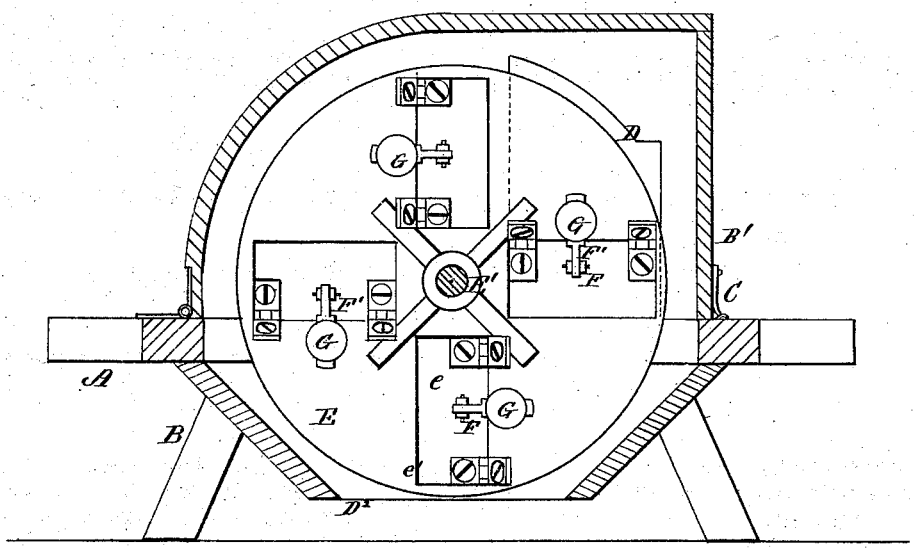
Figure 2:
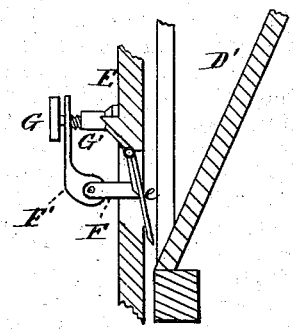

Figure 1 is a vertical longitudinal section of my invention. Fig. 2 is a detail view.

This invention has relation to vegetable-cutters; and consists in the novel construction and combination of parts, as hereinafter described and claimed, having reference particularly to the means for adjusting the knives.

Referring to the accompanying drawings, A designates a frame, having suitable legs B, and supporting a box or drum, B', of a nearly cylindrical form. Said box is made in two sections, hinged together so that the upper section may be raised to give access to the devices for adjusting the knives. When brought together the said sections are secured by means of a suitable fastening, C. D represents an opening in the side of the upper section, and D¹ a hopper or chute communicating with said opening, and designed to convey the uncut meat or vegetables to the cutter. D² is an opening in the bottom of the lower section for the cuttings to pass through. E designates a rotary cutter, consisting of a disk mounted upon a horizontal transverse shaft, E', and having knives e. The latter are of rectangular or other suitable shape, located within corresponding slots e' formed in the disk at intervals.

For the purposes of adjustment, said knives are pivoted or hinged at their back or inner edges to the disk in such a manner that the cutting-edges may be projected any desired distance beyond the vertical face of the disk.

F designates standards attached to the inner surfaces of the knives, and slotted in their ends to receive the ends of the adjusting-levers F', which are slightly bent at their points of attachment. At their other extremities the levers F' have holes bored through them, and threaded for the reception of the adjusting-screws G, which enter the posts G' projecting from the back of the plate. The required adjustment of the knives is obviously effected by turning said screws. The disk E is made to rotate very close to the opening in the side of the box, and receives its motion through the medium of a crank or other suitable device.

Having described my invention, I claim—

The combination, with the rotary slotted disk E, of the hinged or pivoted knives e, standards F, bent levers F', posts G', and adjusting-screws G, substantially as and for the purpose specified.

In testimony that I claim the foregoing I have hereunto set my hand this 24th day of February, 1874.

ZACHARY TAYLOR HARTMAN.

Witnesses:
M. DANL. CONNOLLY,
EUGÈNE P. EADSON.